United States Patent Office
2,753,334
Patented July 3, 1956

2,753,334

PYRAZOLONE METALLIFEROUS AZO-DYESTUFFS

Arthur Buehler, Rheinfelden, and Eduard Moser, Basel, Switzerland, assignors to Ciba Limited, Basel, Switzerland No Drawing. Application October 26, 1951,
Serial No. 253,458

13 Claims. (Cl. 260—147)

According to this invention valuable new metalliferous azo-dyestuffs are made by treating a monoazo-dyestuff which is free from sulfonic acid and carboxylic acid groups and correspond to the general formula (1) 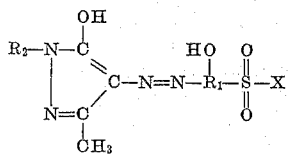

in which $R_1$ represents an aromatic radical of the benzene series containing the hydroxyl group in ortho-position with respect to the azo group, $R_2$ represents an alkyl radical having at least 4 carbon atoms, and X represents an —NH$_2$ group or an alkyl radical of low molecular weight with an agent yielding cobalt or chromium in such manner that the resulting metalliferous dyestuff contains, per molecule of monoazo dyestuff, less than one atom of cobalt or chromium.

The monoazo-dyestuffs used as starting materials and corresponding to the above general formula can be made by coupling an ortho-hydroxy-diazo-compound of the benzene series which is free from sulfonic acid and carboxylic acid groups and contains an —SO$_2$—NH$_2$-group or an alkylsulfone radical of low molecular weight with a pyrazolone of the formula

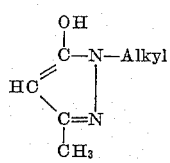

in which the alkyl radical contains at least 4 carbon atoms. The pyrazolone may be made by reacting the corresponding monoalkyl-hydrazine with acetoacetic acid amide or an acetoacetic acid ester, for example, the methyl or ethyl ester. The necessary monoalkyl-hydrazines of the constitution

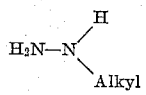

can be made by reacting hydrazine with an alkyl halide, for example, a bromide or chloride, of which the alkyl radical contains at least 4 carbon atoms. The alkyl radicals, which are present in the aforesaid alkyl halides and alkyl hydrazines or in the 1-alkyl-pyrazolones, may have straight or branched chains. The alkyl radical present in the compounds referred to above may be, for example, an n-butyl, isobutyl, 2-ethyl-hexyl, n-amyl, n-hexyl, n-octyl, n-decyl, n-dodecyl, cetyl or octadecyl radical.

The monoalkyl-hydrazines are made by converting hydrazine sulfate in ethyl alcohol into hydrazine hydrate by means of alkali hydroxide and heating a considerable excess of the hydrazine hydrate so dissolved with the alkyl halide for a prolonged period. As the resulting monoalkyl-hydrazine sulfate formed by addition of sulfuric acid to the reaction mixture is considerably more easily soluble in alcohol than the also formed hydrazine sulfate present in excess, the separation can easily be carried out and it is easy to isolate from the reaction mixture a monoalkyl-hydrazine which is sufficiently pure for further working up.

The thus obtained monoalkyl hydrazine can be reacted by a method in itself known, for example, by one of the usual methods for preparing 1-aryl-3-methyl-5-pyrazolones, namely by condensation with acetoacetic acid amide or acetoacetic acid ethyl ester by means of an acid-binding agent to form a 1-alkyl-3-methyl-5-pyrazolone, in the first case advantageously with the addition of acetic acid and an alkali acetate and in the second case with the addition of an alkali hydroxide.

As ortho-hydroxy-diazo-compounds of the benzene series for the preparation of the dyestuffs used as starting materials in the present process there come into consideration diazo-compounds of such ortho-hydroxy-amines of the benzene series as contain in the benzene nucleus an alkyl-sulfone group of low molecular weight (e. g. an —SO$_2$CH$_3$ or —SO$_2$C$_2$H$_5$ group) or an —SO$_2$NH$_2$ group. In addition to these substituents, the hydroxyl group and the amino group, the compounds may contain further substituents such as halogen atoms, for example, chlorine; alkyl groups, for example, methyl; alkoxy groups, for example, methoxy; nitro groups; —CO-alkyl groups, for example, the —CO—CH$_3$ group; or acylamino groups, for example, the acetylamino group. Specially advantageous are ortho-hydroxyaminobenzene sulfonic acid amides such, for example, as 6-nitro-2-amino-1-hydroxybenzene-4-sulfonic acid amide, and especially 2-amino-1-hydroxybenzene-4- or -5-sulfonic acid amide. The following ortho-hydroxy-amines also give valuable results:

2-amino-1-hydroxybenzene-4-methyl sulfone, 2-amino-1-hydroxybenzene-4-ethyl sulfone.

The coupling of the ortho-hydroxydiazo compounds with the pyrazolones can be carried out by methods in themselves known, for example, in a weakly acid to weakly alkaline medium.

When the coupling reaction is finished the dyestuffs, for the purpose of metallizing, can easily be separated, if desired after the addition of sodium chloride, from the coupling mixture by filtration, because they are only slightly soluble in water owing to the lack of groups imparting solubility. Preferably they are used for metallizing in the form of filter cakes without intermediate drying. In many cases it is possible to carry out the metallization directly in the coupling mixture without any intermediate separation.

The monoazo-dyestuffs used as starting materials for the present process and obtainable as described above are new. In general they are not very easily soluble in water even in the form of their alkali compounds. Nevertheless some of them are sufficiently soluble in this form to enable them to dye well from dyebaths requiring no addition of acid, for example, by the single bath chroming process.

The treatment with an agent yielding cobalt or chromium is carried out in accordance with the invention in such manner that a cobaltiferous or chromiferous dyestuff is obtained which contains less than one atomic proportion of cobalt or chromium in complex union for each molecular proportion of dyestuff. Accordingly, metallization is advantageously carried out with such agents yielding cobalt or chromium and by such methods as are known to yield complex cobalt or chromium compounds having the aforesaid constitution. In general it is desirable to use less than one atomic proportion of metal for each molecular proportion of dyestuff and/or to carry out the metallizing operation in a weakly acid to alkaline medium. Consequently, there are especially suitable for carrying out the process cobalt or chromium compounds which are stable towards alkaline media, for example, chromium compounds of aliphatic hydroxy-carboxylic acids or advantageously aromatic ortho-hydroxy-carboxylic acids which contain the chromium in complex union. As examples of aliphatic hydroxy-carboxylic acids there may be mentioned inter alia lactic acid, glycollic acid, citric acid and especially tartaric acid, and as aromatic ortho-hydroxy-carboxylic acids, for example, those of the benzene series such as 4-, 5- or 6-methyl-1-hydroxybenzene-2-carboxylic acid and above all 1-hydroxybenzene-2-carboxylic acid containing no further substituents.

As agents yielding cobalt there are advantageously used simple cobalt salts, such as cobalt acetate or cobalt sulfate.

The conversion of the dyestuff into the complex cobalt or chromium compound is carried out with advantage at a raised temperature under atmospheric or superatmospheric pressure, for example, at the boiling temperature of the reaction mixture, if desired in the presence of suitable additions, for example, in the presence of bases, salts of organic acids, organic solvents or other agents favoring the formation of complexes.

In a special form of the process a mixture of two different metallizable monoazo-dyestuffs is used as starting material, of which dyestuffs both correspond to the general formula hereinbefore given or one corresponds to the said formula and the other to the formula (2)

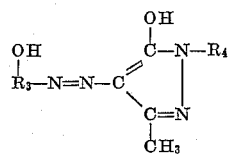

in which $R_3$ represents a benzene radical free from sulfonic acid, carboxylic acid and sulfonic acid amide groups, which is bound to the azo group in ortho-position with respect to the hydroxyl group, and $R_4$ represents an alkyl radical containing at least 4 carbon atoms. In this case, of course, the treatment with an agent yielding cobalt or chromium is carried out in such manner that cobaltiferous or chromiferous dyestuffs are obtained which contain less than one atomic proportion of cobalt or chromium in complex union for each molecular proportion of monoazo-dyestuff.

As examples of dyestuffs of the Formula (2) there may be mentioned more especially those which can be obtained from the above mentioned pyrazolones by coupling with diazo compounds of nitro-ortho-hydroxyamines of the benzene series, for example, 4-nitro- or 5-nitro-2-amino-1-hydroxybenzene.

The dyestuffs obtainable by the present process can also be obtained by a modification of the process in which a cobalt or chromium compound of a monoazo-dyestuff containing one atomic proportion of cobalt or chromium in complex union for each molecular proportion of monoazo-dyestuff (a 1:1-complex) is reacted with a monoazo-dyestuff free from metal, and in which at least one monoazo-dyestuff or a cobalt or chromium compound of a monoazo-dyestuff is used which is free from sulfonic acid and carboxylic acid groups and has the general formula (1)

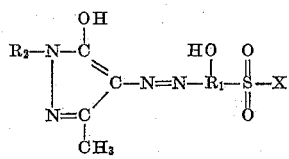

in which $R_1$ represents an aromatic radical of the benzene series containing the hydroxyl group in ortho-position to the azo group, $R_2$ represents an alkyl radical having at least 4 carbon atoms, and X represents an $—NH_2$ group or an alkyl radical of low molecular weight.

In this form of the process the starting materials may be so chosen that either the monoazo-dyestuff present in the complex cobalt or chromium compound (1:1 complex), or the metal-free dyestuff or both of these dyestuffs correspond to the above general formula.

The 1:1-complexes used as starting materials in this form of the process can be produced by methods in themselves known, for example, by reacting the monoazo-dyestuff free from complex forming metal in an acid medium with an excess of a salt of cobalt or chromium, for example, chromium fluoride or a chromium sulfate at the boiling temperature, or if desired at a temperature exceeding 100° C.

The reaction of the resulting 1:1-metal complexes with metal-free dyestuffs is advantageously carried out in an aqueous neutral to alkaline medium at ordinary temperature or a raised temperature.

In order to obtain by this form of the process the especially valuable 1:2-complexes distinguished by their good solubility it is in general desirable to react together approximately equimolecular proportions of the cobaltiferous or chromiferous dyestuff (1:1-complex) and metal-free dyestuff.

The new products obtainable by the processes described above are cobalt or chromium compounds which contain two monoazo-dyestuffs so bound in complex union that the ratio of the number of cobalt or chromium atoms bound in complex union to the number of monoazo-dyestuff molecules is smaller than 1:1, and preferably about 1:2, and in which the two monoazo-dyestuffs are free from sulfonic acid and carboxylic acid groups and correspond to the general formula

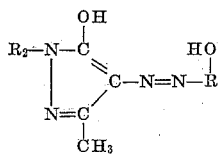

in which $R_2$ represents an alkyl radical containing at least 4 carbon atoms, and R represents a benzene radical bound to the azo group in a position vicinal to the hydroxyl group, and at least one of the two monoazo-dyestuffs still contains bound to the radical R an $—SO_2—NH_2$-group or an alkyl sulfone radical of low molecular weight. Compounds of this composition in which the alkyl radical $R_2$ contains 4–18, and preferably 4–8, carbon atoms are especially valuable.

The new cobaltiferous and chromiferous dyestuffs are soluble in water and are in fact more soluble than the metal-free starting materials used to prepare them. They are suitable for dyeing or printing a very wide variety of materials, but above all for dyeing animal material such as silk, leather and especially wool, but also for dyeing or printing synthetic fibers composed of superpolyamides or superpolyurethanes. In contradistinction to the chromium compounds of dyestuffs containing sulfonic acid groups, which are advantageously applied for dyeing from strongly acid, for example, sulfuric acid, baths, the new chromium and cobalt compounds of monoazo-dyestuffs free from sulfonic acid groups are principally suitable for dyeing from neutral to weakly acid, advantageously acetic acid, baths. If desired, the dyebath may contain textile auxiliaries, e. g. ethylene oxide condensation products, which promote levelling or prevent tippy dyeing. The wool dyeings so obtained are distinguished by their uniformity, good properties of wet fastness and very good fastness to light.

The following examples illustrate the invention, the parts and percentages being by weight unless otherwise stated and the relationship between parts by weight and

Example 1

18.8 parts of 2-amino-1-hydroxyzenzene-5-sulfonic acid amide are dissolved in 400 parts of water with the addition of 4 parts of sodium hydroxide. After the addition of 34 parts of hydrochloric acid of 30 per cent. strength a solution of 6.9 parts of sodium nitrite in 25 parts of water is run in at a temperature of 0–5° C. When the diazotization is finished, the diazo compound, which is partially precipitated in a crystalline form is neutralized by the addition of sodium carbonate and added to a cooled solution obtained from 15.4 parts of 1-n-butyl-3-methyl-5-pyrazolone, 4 parts of sodium hydroxide, 13.6 parts of crystalline sodium acetate and 250 parts of water. When the coupling is finished, the dyestuff formed is precipitated by the addition of sodium chloride and separated by filtration. When dry it is a brown powder which dissolves in water and in concentrated sulfuric acid with an orange coloration and dyes wool from an acid bath yellow tints which can be converted by after-chroming into reddish orange tints of good fastness to fulling and light. The dyestuff is also suitable for dyeing by the single bath chroming process.

35.2 parts of the resulting dyestuff are dissolved in 2000 parts of water. 125 parts of a solution of sodium chromo-salicylate having a chromium content of 2.6 per cent. are added. Chroming is completed by boiling the whole for about 6 hours under reflux. The chromium complex so formed is precipitated by the addition of sodium chloride, neutralized with acetic acid, and separated by filtration. When dry it is a red-orange powder which dissolves in water with an orange coloration and in concentrated sulfuric acid with a green-yellow coloration, and dyes wool either from a neutral or acetic acid bath full reddish orange tints having good properties of wet fastness and a very good fastness to light.

The dark green solution of sodium chromosalicylate is obtained by boiling 362 parts of an aqueous solution of chromic sulfate having a chromium content of 7.2 per cent. with 138 parts of salicylic acid, dissolving the resulting chromosalicylic acid by the addition of a sufficient quantity of sodium hydroxide solution of 30 per cent. strength to produce a reaction distinctly alkaline to phenolphthalein and making up the mixture to 1000 parts with water.

The 1-n-butyl-3-methyl-5-pyrazolone used in this example may, for example, be prepared as follows:

210 parts of sodium hydroxide of 98 per cent. strength are dissolved in 700 parts of ethyl alcohol and two portions of 168 parts each of hydrazine sulfate of about 99 per cent. strength are added at a temperature below 40° C., while stirring. After 30 minutes there are added in the same manner alternately 100 parts of sodium hydroxide of 98 per cent. strength and 168 parts of hydrazine sulfate, and then 95 parts of sodium hydroxide of 98 per cent. strength and 168 parts of hydrazine sulfate. The easily stirrable mass so obtained is stirred in the cold overnight and filtered with suction to remove the sodium sulfate formed. The sodium sulfate is washed with 200 parts of ethyl alcohol. The filtrate is united with the alcoholic washings and made up with alcohol to 1000 parts by volume.

The solution so obtained is boiled with 137 parts of n-butyl bromide (about 1 mol per 5 mols of hydrazine) under reflux for 18 hours while stirring well, and then allowed to cool. At 10–20° C. there are then slowly run in while stirring 500 parts of sulfuric acid of 98 per cent. strength (5 mols), and the whole is further stirred for 1 hour. The hydrazine sulfate precipitated in a fine sandy form is separated by filtering with suction and washed with alcohol. By concentrating the filtrate n-butyl-hydrazine sulfate is easily caused to crystallize and is then separated by filtration. White needles are obtained which melt at 140–141° C.

37.2 parts of n-butyl-hydrazine sulfate are stirred in 480 parts of water having a temperature of 30–40° C. and 55 parts of crystalline sodium acetate and 5 parts of glacial acetic acid are added. 20.2 parts of acetoacetic acid amide (obtainable as described in Example 7 of U. S. Patent No. 2,152,132 by Albert B. Boese of March 28, 1939) and the whole is stirred for a few hours longer at room temperature. The pyrazolone formed precipitates slowly. It is separated by filtration, washed with water, and dried in vacuo at 50° C.

Example 2

18.8 parts of 2-amino-1-hydroxybenzene-4-sulfonic acid amide are dissolved in 200 parts of water with the addition of 25 parts of hydrochloric acid of 30 per cent. strength, and diazotized at 4–5° C. with a solution of 6.9 parts of sodium nitrite in 25 parts of water. The diazo-solution is neutralized with a dilute aqueous solution of sodium carbonate and then coupled with a cooled solution of 21.0 parts of 1-n-octyl-3-methyl-5-pyrazolone, 4 parts of sodium hydroxide and 16.4 parts of anhydrous sodium acetate in 400 parts of water. Coupling is complete in a short time. The completely precipitated dyestuff is separated by filtration. By drying the moist filter cake an orange powder is obtained which dissolves with considerable difficulty in hot water to give an orange coloration, and dissolves in concentrated sulfuric acid to give a yellow coloration, and dyes wool from an acid bath yellow tints which when after-chromed are converted into orange tints having good properties of wet fastness. This dyestuff can also be used successfully for dyeing by the single bath chroming process.

40.9 parts of the above dyestuff (in the form of the moist filter cake) are stirred in 1500 parts of water, and mixed with 125 parts of a solution of sodium chromosalicylate having a chromium content of 2.6 per cent. After boiling the reaction mixture for 3 hours the metallization is complete. The resulting chromium complex is completely separated by acidification with acetic acid, separated by filtration, and dissolved in 1000 parts of water at 50° C. with the addition of 4 parts of sodium hydroxide. The complex is precipitated from the solution by the addition of sodium chloride. The water-soluble dyestuff so obtained is the complex chromium compound containing one atom of chromium in complex union with two monoazo dyestuffs both of which correspond to the formula

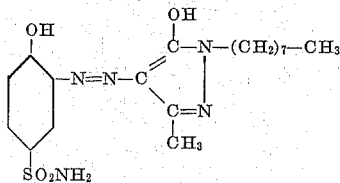

It dyes wool either from a neutral or acetic acid bath orange tints having good properties of fastness to light and washing, and exhibits a pronounced levelling capacity.

A similar chromium complex is obtained by using instead of the above dyestuff, 44.5 parts of the dyestuff obtained as described below and otherwise working in an analogous manner:

23.3 parts of 6-nitro-2-amino-1-hydroxybenzene-4-sulfonic acid amide are dissolved in 200 parts of water with the addition of 25 parts of hydrochloric acid of 30 per cent. strength, and diazotized at 4–5° C. with a solution of 6.9 parts of sodium nitrite in 25 parts of water. The diazo solution is neutralized with a dilute solution of sodium carbonate and then coupled with a cooled solution of 21.0 parts of 1-n-octyl-3-methyl-5-pyrazolone, 4 parts of sodium hydroxide and 5.3 parts of sodium carbonate in 200 parts of water. When the coupling is complete, the precipitated dyestuff which is the complex chromium compound containing one atom of chromium in complex union with two monoazo dyestuffs both of which correspond to the formula

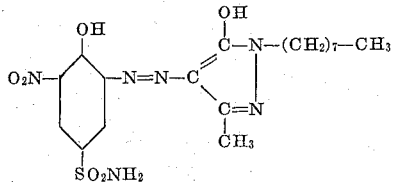

is separated by filtration, washed and dried. It is a brown-red powder which dissolves in water with an orange coloration and in concentrated sulfuric acid with a green yellow coloration and dyes wool from an acid bath orange tints which when after-chromed change little and have excellent properties of wet fastness and fastness to light. The dyestuff is also suitable for dyeing by the single bath chroming process.

*Example 3*

15.4 parts of 5-nitro-2-amino-1-hydroxybenzene are dissolved in 60 parts of water with the addition of 4 parts of sodium hydroxide. After the addition of a solution of 6.9 parts of sodium nitrite in 25 parts of water, the whole is allowed to run into a mixture of 34 parts of hydrochloric acid of 30 per cent. strength and 200 parts of ice. When the diazotization is complete, the whole is neutralized by the addition of sodium carbonate and then the diazo-suspension so obtained is run into a cooled solution of 15.4 parts of 1-n-butyl-3-methyl-5-pyrazolone, 4 parts of sodium hydroxide, 13.6 parts of crystalline sodium acetate and 250 parts of water. When the coupling is complete the precipitated dyestuff is separated by filtration. When dry it is a dark brown powder which dissolves in water with an orange coloration and in concentrated sulfuric acid with a yellow coloration, and dyes wool from an acetic acid bath orange tints which when after-chromed change to red tints having good properties of wet fastness. The dyestuff is also very suitable for dyeing by the single bath chroming process.

15.9 parts of the above dyestuff and 18.0 parts of the dyestuff obtainable from diazotized 2-amino-1-hydroxybenzene-5-sulfonic acid amide and 1-n-butyl-3-methyl-5-pyrazolone as described in the first paragraph of Example 1, are boiled in 2000 parts of water and mixed with 125 parts of a solution of sodium chromosalicylate having a chromium content of 2.6 per cent. After boiling for 6 hours under reflux the chroming is complete. The mixed complex so formed is completely separated by the addition of sodium chloride and neutralization with dilute acetic acid and dried. The resulting black powder dissolves in water with a red coloration and in concentrated sulfuric acid with a yellow coloration and dyes wool from an acetic acid bath full red tints having good properties of fastness.

A similar mixed complex which is the complex chromium compound containing one atom of chromium in complex union with two monoazo dyestuffs one of which corresponds to the formula

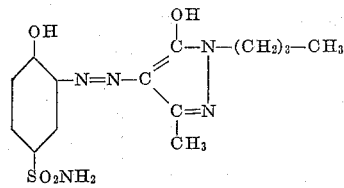

and the other to the formula

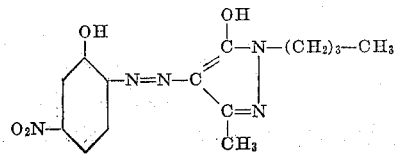

is obtained by using the dyestuff from 2-amino-1-hydroxybenzene-4-sulfonic acid amide and 1-n-butyl-3-methyl-5-pyrazolone, instead of that from 2-amino-1-hydroxybenzene-5-sulfonic acid amide and 1-n-butyl-3-methyl-5-pyrazolone.

A red orange dyeing chromium complex is obtained when in this example the dyestuff from diazotized 5-nitro-2-amino-1-hydroxybenzene and 1-n-butyl-3-methyl-5-pyrazolone is replaced by that from 4-nitro-2-amino-1-hydroxybenzene and 1-n-butyl-3-methyl-5-pyrazolone, the procedure being analogous otherwise.

*Example 4*

18.8 parts of 2-amino-1-hydroxybenzene-4-methyl-sulfone are dissolved in 400 parts of water and after the addition of 22 parts of hydrochloric acid of 30 per cent. strength and ice, diazotized at 0–5° C. by the addition of a solution of 6.9 parts of sodium nitrite in 25 parts of water. The clear diazo solution is neutralized by the addition of sodium carbonate and then added to a cooled solution of 15.4 parts of 1-n-butyl-3-methyl-5-pyrazolone, 4 parts of sodium hydroxide, 13.6 parts of crystalline sodium acetate in 250 parts of water. When the coupling has finished the dyestuff is completely precipitated and separated by filtration. When dry it is an orange powder which dissolves in hot water with an orange coloration, in dilute sodium carbonate solution with a green yellow coloration and in concentrated sulfuric acid with a yellow coloration, and dyes wool from an acid bath yellow tints, which when after-chromed are converted to orange tints having good properties of wet fastness. The dyestuff is also suitable for dyeing by the single bath chroming process.

35.1 parts of the above dyestuff are dissolved in 2000 parts of water. 125 parts of a solution of sodium chromosalicylate having a chromium content of 2.6 per cent. are added. After boiling for 5 hours under reflux chroming is complete. By the addition of sodium chloride the chromium complex so formed is precipitated. After cooling it is separated by filtration and dried. The dyestuff is a brown powder which dissolves in water with an orange yellow coloration and in concentrated sulfuric acid with a green-yellow coloration and dyes wool from an acetic acid bath full orange yellow tints of good fastness to fulling and light.

*Example 5*

17.6 parts of the dyestuff from diazotized 2-amino-1-hydroxybenzene-4-sulfonic acid amide and 1-n-butyl-3-methyl-5-pyrazolone, which is obtainable in the manner described in the first paragraph of Example 2 by using 1-n-butyl-3-methyl-5-pyrazolone instead of 1-n-octyl-3-methyl-5-pyrazolone, and 27 parts of the dyestuff from diazotized 6-nitro-2-amino-1-hydroxybenzene-4-sulfonic acid amide and 1-n-octyl-3-methyl-5-pyrazolone (Example 2, last paragraph) are suspended in 2000 parts of water, mixed with 125 parts of a solution of sodium chromosalicylate having a chromium content of 2.6 per cent., and boiled for 4 hours under reflux. At the end of this period the chroming is complete. The chroming complex so formed is precipitated by the addition of sodium chloride and separated by filtration. It is an orange powder which dissolves in water with an orange coloration and in concentrated sulfuric acid with a yellow coloration, and dyes wool either from a neutral or acetic acid bath full orange tints having good properties of fastness.

1-n-octyl-3-methyl-5-pyrazolone can be prepared for example as follows:

48.4 parts of n-octyl-hydrazine sulfate, which can be prepared from n-octyl-chloride by the method described in Example 1 for use with n-butyl-hydrazine sulfate, are stirred in 220 parts of water and 26 parts of acetoacetic acid ethyl ester are poured in while stirring at room temperature. The sulfuric acid liberated is neutralized in the course of 3 hours with a total of 48 parts of sodium hydroxide of 30 per cent. strength. The hydrazone precipitates in the form of a yellow oil. 40 parts of an aqueous solution of sodium hydroxide of 30 per cent. strength are poured into the suspension, and the whole is heated for 1 hour at 70° C. The clear solution is allowed to cool to room temperature, 1-n-octyl-3-methyl-5-pyrazolone is precipitated by acidification with 40 parts of hydrochloric acid of 30 per cent. strength. The pyrazolone precipitates out first in an oily form and after stirring in the cold becomes solid. The pyrazolone is separated by filtration and dried in vacuo at 45° C.

*Example 6*

35.2 parts of the dyestuff obtained according to the first paragraph of Example 1 are dissolved in 1000 parts of water with the addition of 8 parts of sodium hydroxide, and heated to 80° C. There are then added 100 parts of a cobalt sulfate solution with a cobalt content of 3.25%. After about 30 minutes' stirring at 75-80° C. the metallization is complete. If necessary, the resultant orange colored solution is filtered, then neutralized by the addition of acetic acid, and evaporated to dryness. The dyestuff so obtained is a brown powder which dissolves in water with an orange coloration and in concentrated H₂SO₄ with a yellow coloration, and dyes wool from a weakly acetic acid bath orange tints of good light and wet fastness properties.

When in this example 35.1 parts of the dyestuff obtained according to the first paragraph of Example 4 are used instead of the 35.2 parts of dyestuff obtained according to the first paragraph of Example 1, a cobalt compound is obtained in the form of a brown powder. It dissolves in water with an orange coloration and in concentrated H₂SO₄ with a yellow coloration and dyes wool from an acetic acid bath reddish yellow tints of good light and wet fastness properties.

*Example 7*

40.9 parts of the dyestuff obtained according to the first paragraph of Example 2 are dissolved in 1200 parts of water with the addition of 8 parts of sodium hydroxide, and heated to 80° C. There are then added 100 parts of a cobalt sulfate solution with a cobalt content of 3.25%. After about 30 minutes' stirring at 75-80° C. metallization is complete. If necessary, the resultant orange colored solution is filtered; it is then neutralized by the addition of acetic acid, and evaporated to dryness. The dyestuff so obtained is a yellow-brown powder which dissolves in water with an orange coloration, and in concentrated H₂SO₄ with a greenish yellow coloration, and dyes wool from an acetic acid bath full reddish yellow tints of good fastness to light.

*Example 8*

17.6 parts of the dyestuff from 2-amino-1-hydroxybenzene-4-sulfonic acid amide and 1-n-butyl-3-methyl-5-pyrazolone and 15.9 parts of the dyestuff from 5-nitro-2-amino-1-hydroxybenzene and 1-n-butyl-3-methyl-5-pyrazolone are dissolved in 1000 parts of water with the addition of 8 parts of sodium hydroxide, then heated to 80° C. and admixed with 100 parts of a cobalt sulfate solution having a cobalt content of 3.25%. After 30 minutes' stirring at 75-80° C. metallization is complete. The brown-red solution is evaporated to dryness. The dyestuff so obtained is a greenish powder with a bronze lustre. It dissolves in water with an orange coloration, and in concentrated sulfuric acid with a yellow coloration, and dyes wool from an acetic bath red brown tints of good light and wet fastness properties.

*Example 9*

18.8 parts of 2-amino-1-hydroxybenzene-4-sulfonic acid amide are dissolved in 200 parts of water with the addition of 25 parts of hydrochloric acid of 30% strength, and diazotized at 4-5° C. with a solution of 6.9 parts of sodium nitrite in 25 parts of water. The diazo solution is neutralized with a dilute aqueous sodium carbonate solution and then coupled with a cooled solution obtained from 18.2 parts of 1-n-hexyl-3-methyl-5-pyrazolone, 4 parts of sodium hydroxide, and 16.4 parts of anhydrous sodium acetate in 400 parts of water. Coupling is complete within a short time. The completely separated dyestuff is separated by filtration. On drying the moist filter cake there is obtained an orange-colored powder which dissolves but difficultly in hot water with an orange coloration, and dissolves in concentrated sulfuric acid with a yellow coloration, and dyes wool by the single bath chroming process yellowish orange tints of good wet fastness properties.

38.1 parts of this dyestuff (in the form of the moist filter cake) are stirred in 1500 parts of water and mixed with 125 parts of a solution of sodium chromosalicylate with a chromium content of 2.6%. The reaction mixture is boiled for 3 hours to complete metallization. The resultant chromium complex which contains one atom of chromium in complex union with two monoazo dyestuffs both of which correspond to the formula

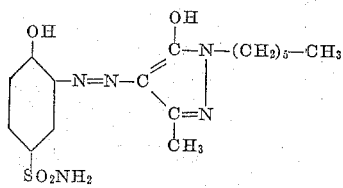

is precipitated by the addition of sodium chloride and neutralization with acetic acid, then filtered and dried. It is a red powder which dissolves in water with an orange coloration, and in concentrated sulfuric acid with a yellow coloration, and dyes wool from a neutral to acetic acid bath full orange tints of excellent fastness properties.

38.1 parts of the dyestuff obtained according to the first paragraph of this example are dissolved in 1000 parts of water with the addition of 8 parts of sodium hydroxide, and heated to 75-80° C. 100 parts of a cobalt sulfate solution with a cobalt content of 3.25% are added. After about 30 minutes' stirring at 75-80° C. metallization is complete. The orange colored solution so obtained is neutralized by the addition of acetic acid, and evaporated to dryness. The resultant cobalt complex which contains one atom of cobalt in complex union with two monoazo dyestuffs both of which correspond to the formula

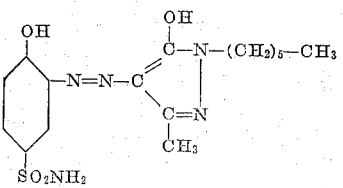

is a brown powder which dissolves in water with a brown-yellow coloration and in concentrated sulfuric acid with a yellow coloration, and dyes wool from a neutral or acetic acid bath brownish yellow tints of good fastness properties.

Very similar dyestuffs are obtained when in lieu of 18.2 parts of 1-n-hexyl-3-methyl-5-pyrazolone 21 parts of 1-(2'-ethylhexyl)-3-methyl-5-pyrazolone are used, the procedure being the same otherwise.

*Example 10*

Following the procedure of the first paragraph of Example 9, there is obtained, by the use of 16.8 parts of 1-n-amyl-3-methyl-5-pyrazolone instead of the 18.2 parts of 1-n-hexyl-3-methyl-5-pyrazolone, a dyestuff which after drying is an orange colored powder. It dissolves but difficultly in hot water with an orange coloration, and dissolves in concentrated sulfuric acid with a yellow coloration and dyes wool by the single bath chroming process orange tints.

By the method described in the second paragraph of Example 9, a chromium complex is obtained from this dyestuff. This complex dissolves in water with an orange coloration, and in concentrated sulfuric acid with a yellow coloration, and dyes wool from an acetic acid bath valuable orange tints of good fastness.

By the method of the third paragraph of Example 9 a cobalt complex of this dyestuff is obtained which dissolves in water with an orange coloration and in concentrated sulfuric acid with a brown coloration, and dyes wool from an acetic acid bath brownish yellow tints of good fastness.

*Example 11*

The dyestuff from diazotized 2-amino-1-hydroxybenzene-5-sulfonic acid amide and 1-n-amyl-3-methyl-5-pyrazolone is prepared by the method described in the first paragragh of Example 9, from 18.8 parts of 2-amino-1-hydroxybenzene-5-sulfonic acid amide and 16.8 parts of 1-n-amyl-3-methyl-5-pyrazolone.

This dyestuff is chromed by the method indicated in the second paragraph of Example 9. The resultant chromium compound is a black-brown powder which dissolves in water with an orange coloration and in concentrated sulfuric acid with a yellow coloration, and dyes wool from an acetic acid bath full red-orange tints of good fastness properties.

The cobalt compound obtained from this dyestuff by the method described in the third paragraph of Example 9 is a brown powder which dissolved in water and in concentrated sulfuric acid with a yellow coloration and dyes wool from an acetic acid bath brownish orange tints of good fastness properties.

*Example 12*

100 parts of well wetted wool are entered at 40–50° C. into a dyebath containing in 4000 parts of water the chromiferous dyestuff obtained according to the first and second paragraphs of Example 1 and 10 parts of crystalline sodium sulfate. 3 parts of acetic acid of 40 per cent. strength are added and the bath is heated to the boiling temperature for half an hour. Dyeing is carried out for 45 minutes. Finally, the wool is rinsed with cold water and dried. A full reddish orange dyeing is obtained which has good wet and light fastness properties.

The same result is obtained without an addition of acetic acid.

*Example 13*

100 parts of well wetted wool are entered at 40–50° C. into a dyebath containing in 4000 parts of water 1 part of the cobaltiferous dyestuff obtained according to Example 7 and 10 parts of crystallin sodium sulfate. 3 parts of acetic acid of 40 per cent. strength are added and the bath is heated to the boiling temperature for half an hour. Dyeing is carried out for 45 minutes. Finally, the wool is rinsed in cold water and dried. A full redrish yellow dyeing is obtained which has good wet and light fastness properties.

By using in this example 100 parts of polyamide fibers (nylon fibers) instead of wool and 1 part of the chromiferous dyestuff obtained according to the first and second paragraphs of Example 2 in lieu of the above dyestuff an orange dyeing is obtained which has a good wet and light fastness.

What is claimed is:

1. A complex metal compound containing two monoazo dyestuff molecules so bound in complex union with a member selected from the group consisting of a chromium and a cobalt atom that the ratio of the number of metal atoms bound in complex union to the number of monoazo dyestuff molecules is smaller than 1:1 and substantially about 1:2, and in which the two monoazo dyestuffs present are free from sulfonic acid and carboxylic acid groups and correspond to the formula

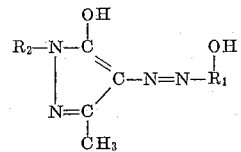

in which $R_1$ represents a benzene radical bound to the azo group in a position vicinal to the hydroxy group and $R_2$ represents an alkyl radical containing at least 4 and at most 8 carbon atoms, at least one of the two monoazo dyestuffs present in the complex compound containing a substituent bound to the radical $R_1$ in one of the positions meta and para relatively to the OH group thereof, which substituent is selected from the group consisting of the radical —$SO_2NH_2$ and the radical —$SO_2$-alkyl wherein alkyl stands for an alkyl group of at most 2 carbon atoms.

2. A complex chromium compound containing one atom of chromium in complex union with two monoazo dyestuffs free from sulfonic acid and carboxylic acid groups, and of which one corresponds to the formula

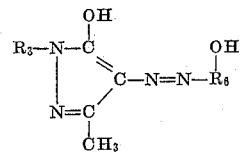

in which $R_6$ represents a benzene radical bound to the azo group in a position vicinal to the hydroxyl group and containing a nitro group, and $R_3$ represents an alkyl radical of 4 to 8 carbon atoms, and the other corresponds to the formula

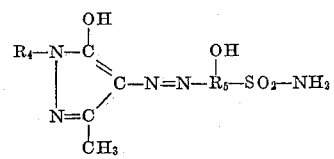

in which $R_4$ represents an alkyl radical of 4 to 8 carbon atoms and $R_5$ represents a benzene radical bound to the azo group in a position vicinal to the hydroxyl group thereof, and to the $SO_2NH_2$ in para position to the said hydroxyl group.

3. A complex chromium compound containing one atom of chromium in complex union with two monoazo dyestuffs free from sulfonic acid and carboxylic acid groups, and of which one corresponds to the formula

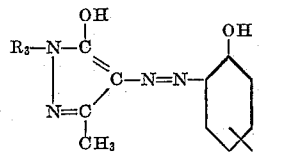

in which $R_3$ represents an alkyl radical containing at least 4 and at most 8 carbon atoms, and the other corresponds to the formula

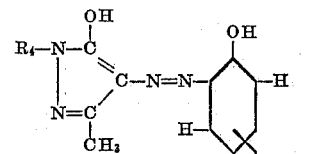

in which R₄ represents an alkyl radical containing at least 4 and at most 8 carbon atoms.

4. A complex chromium compound containing one atom of chromium in complex union with two monazo dyestuffs free from sulfonic acid and carboxylic acid groups, both of which correspond to the formula

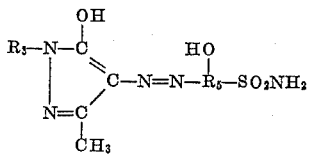

wherein R₃ represents an alkyl radical containing at least 4 and at most 8 carbon atoms and R₅ represents a benzene radical bound to the azo group in a position vicinal to the hydroxyl group thereof, the SO₂NH₂ group being in para position to such hydroxyl group.

5. A complex cobalt compound containing one atom of cobalt in complex union with two monazo dyestuffs free from sulfonic acid and carboxylic acid groups, both of which correspond to the formula

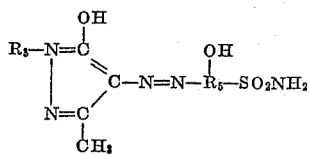

wherein R₃ represents an alkyl radical containing at least 4 and at most 8 carbon atoms and R₅ represents a benzene radical bound to the azo group in a position vicinal to the hydroxyl group thereof, the SO₂NH₂ group being in para position to such hydroxyl group.

6. A complex chromium compound containing one atom of chromium in complex union with two monoazo dyestuffs free from sulfonic acid and carboxylic acid groups, both of which correspond to the formula

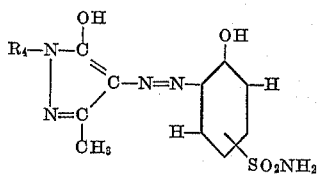

wherein R₄ represents an alkyl radical containing at least 4 and at most 8 carbon atoms.

7. A complex cobalt compound containing one atom of cobalt in complex union with two monoazo dyestuffs free from sulfonic acid and carboxylic acid groups, both of which correspond to the formula

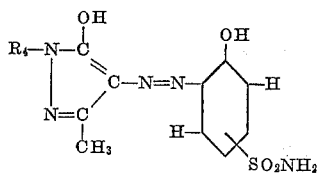

wherein R₄ represents an alkyl radical containing at least 4 and at most 8 carbon atoms.

8. A complex chromium compound containing one atom of chromium in complex union with two monoazo dyestuffs free from carboxylic and sulfonic acid groups one of which corresponds to the formula

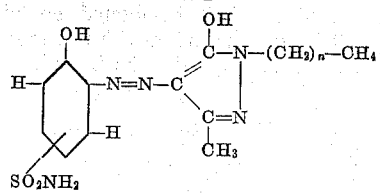

wherein $n$ is at least 3 and at most 7, and the other to the formula

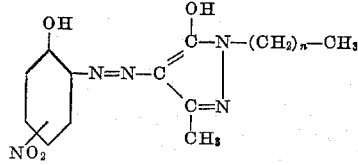

wherein $n$ is at least 3 and at most 7.

9. The complex chromium compound containing one atom of chromium in complex union with two monoazo dyestuffs one of which corresponds to the formula

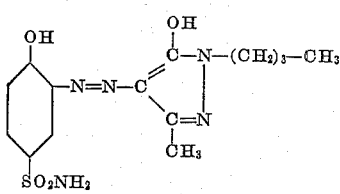

and the other to the formula

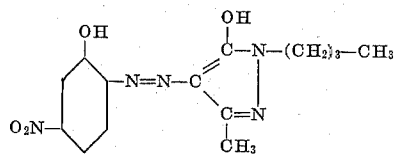

10. The complex chromium compound containing one atom of chromium in complex union with two monoazo dyestuffs both of which correspond to the formula

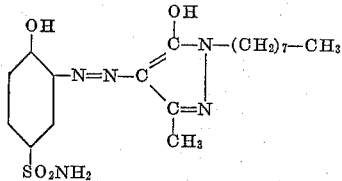

11. The complex chromium compound containing one atom of chromium in complex union with two monoazo dyestuffs both of which correspond to the formula

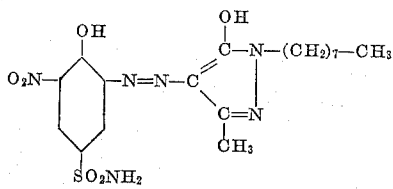

12. The complex chromium compound containing one atom of chromium in complex union with two monoazo dyestuffs both of which correspond to the formula

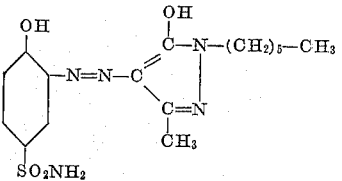

13. The complex cobalt compound containing one atom of cobalt in complex union with two monoazo dyestuffs both of which correspond to the formula
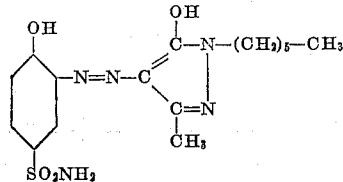
References Cited in the file of this patent
UNITED STATES PATENTS
| | | |
|---|---|---|
| 1,623,005 | Gubler et al. | Mar. 29, 1927 |
| 2,048,898 | Straub et al. | July 28, 1936 |
| 2,476,986 | Martin | July 26, 1949 |
| 2,565,898 | Widmer et al. | Aug. 28, 1951 |